United States Patent [19]

Roberts

[11] 4,202,721
[45] May 13, 1980

[54] HEAT SEALING MECHANISM

[75] Inventor: John P. Roberts, Cantonment, Fla.

[73] Assignee: St. Regis Paper Company, West Nyack, N.Y.

[21] Appl. No.: 872,669

[22] Filed: Jan. 26, 1978

[51] Int. Cl.² .................. B32B 31/00; B30B 15/34; B02C 11/08; H05B 1/00
[52] U.S. Cl. .................................. 156/358; 34/1; 93/DIG. 1; 100/93 RP; 156/359; 156/583.5; 219/243; 219/388
[58] Field of Search ............... 156/583, 582, 583.5, 156/358, 359, 365; 219/243, 4, 388 W; 100/93 RP, 153; 93/DIG. 1; 34/1

[56] References Cited

U.S. PATENT DOCUMENTS

| | | | |
|---|---|---|---|
| 1,361,970 | 12/1920 | Dickey | 156/311 |
| 1,929,903 | 10/1933 | Schindler | 156/178 |
| 2,224,370 | 12/1940 | Wescott | 156/322 |
| 2,290,386 | 7/1942 | Schindler | 156/352 |
| 2,371,357 | 3/1945 | Schindler | 156/176 |
| 2,434,541 | 1/1948 | Bierer | 156/80 |
| 2,469,972 | 5/1949 | Lowry | 156/498 |
| 2,479,290 | 8/1949 | Auxier et al. | 156/583 |
| 2,492,530 | 12/1949 | Kriegsheim | 144/281 C |
| 2,767,113 | 10/1956 | Bower | 339/159 R |
| 3,057,075 | 10/1962 | Lipke | 100/93 RP |
| 3,231,449 | 1/1966 | Tomson | 156/583 |
| 3,367,261 | 2/1968 | Kashiwagi | 100/93 RP |
| 3,378,430 | 4/1968 | Aizawa | 100/93 RP |
| 3,668,786 | 6/1972 | Barny | 100/153 |
| 3,883,284 | 5/1975 | Mets | 100/153 |
| 3,907,473 | 9/1975 | Mets | 100/153 |

Primary Examiner—Douglas J. Drummond
Attorney, Agent, or Firm—Pearne, Gordon, Sessions

[57] ABSTRACT

Heat is applied to a heat sealable material which may be in the form of a bag, for example, to seal a portion of the bag. This may be the top, bottom or side of the bag, and one form of heat sealable material is a plastic film such as polyethylene, either as a coating on the inside of a paper kraft bag or as a separate ply. The two portions to be heat sealed are juxtaposed and passed between endless metal bands which move in synchronism with the heat sealable material as a part of the conveyor means for the heat sealable material. Heat is imparted to the heat sealable material from the metal bands and it is imparted to the metal bands by electrical current conducted into the bands by collector rings on the pulleys over which the metal band is entrained. The heat is conducted through the kraft ply to the heat sealable material to cause the two portions to be sealed together. The foregoing abstract is merely a resume of one general application, is not a complete discussion of all principles of operation or applications, and is not to be construed as a limitation on the scope of the claimed subject matter.

8 Claims, 8 Drawing Figures

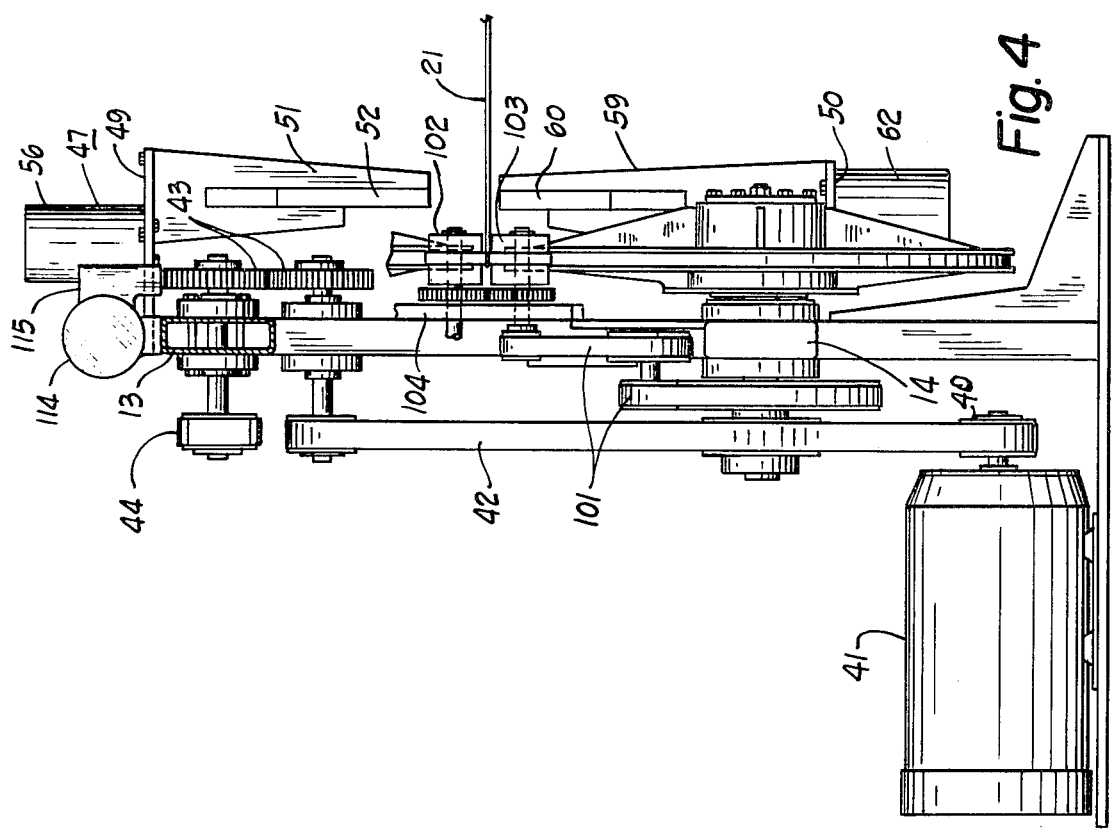
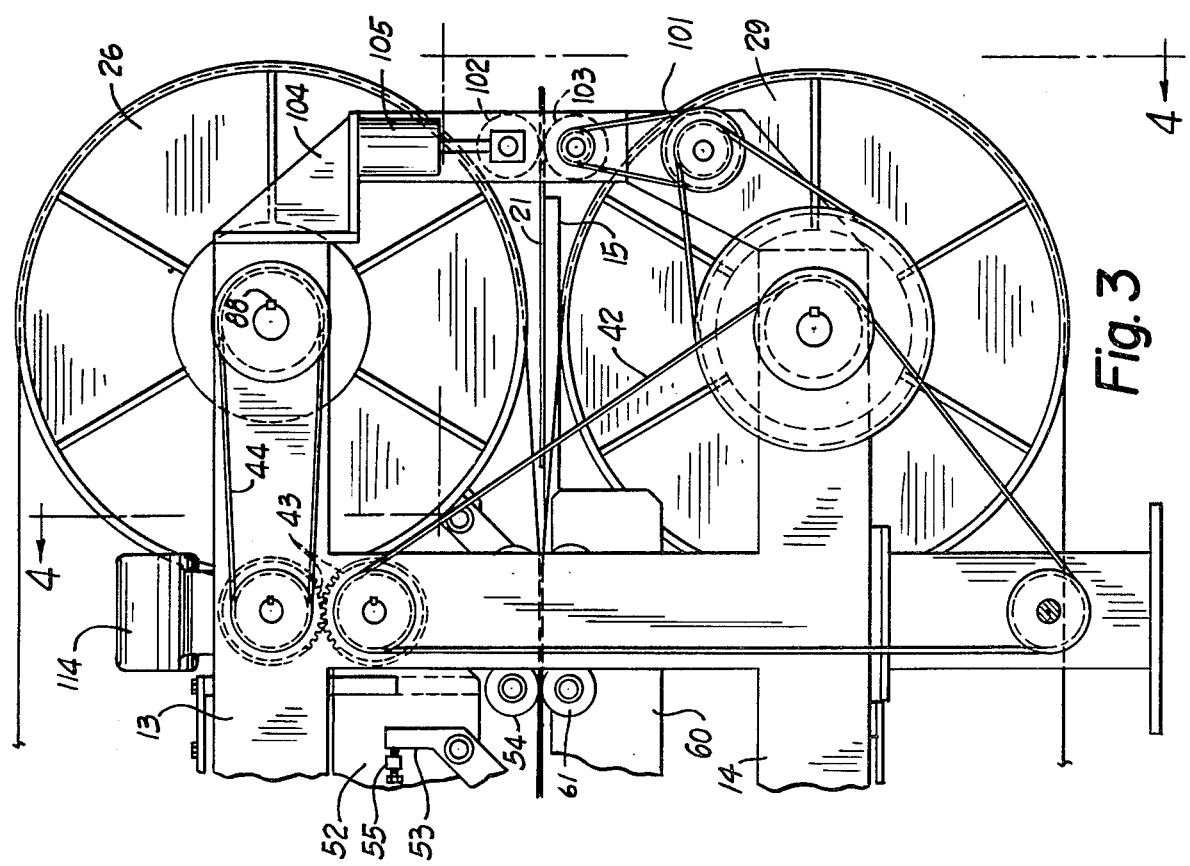

HEAT SEALING MECHANISM

BACKGROUND OF THE INVENTION

Prior art heat sealing machines used movable endless metal bands to press together the portions of heat sealable material to be sealed. A typical construction was to use a steam heated or electrically heated stationary block frictionally engaging the rear of the run of endless metal belt at the sealing zone. This passed heat to the metal band and then the metal band passed heat to the material to be sealed. In another prior art construction electrically heated blocks were linked together like a caterpillar tractor tread and an endless metal belt encircled this caterpillar tread to be heated by the electrically heated blocks. Such systems were inefficient in transfer of heat and also had a large heat storage capacity so that they could not respond quickly to required changes in heat. Many electrical heaters were the sheathed type wherein an electrical resistance wire is separated from a tubular metal sheath by electrical insulation. This electrical insulation is also generally a heat insulation so that the transfer of heat from the inner electrical resistance wire to the outer tubular metal sheath was not a rapid process. Next the heat had to be transferred from the tubular sheath to the heater blocks to heat the large mass of such block. Next the heat had to be transferred from the heater block to the rear of the endless metal band. The lack of good surface contact therebetween retarded the heat flow. One result was that the entire sealing machine then became quite hot and personnel had to be shielded from all this excess heat. Another defect was the slowness of operation of the machines. Where the sealing machine was used in the construction of bags to seal one end of the bag, a production rate of 60 bags per minute was a usual speed.

A prime difficulty with such prior art sealing mechanisms was the high wear factor developed between the bands and the heater blocks. In one prior art bag making machine the wear was excessive both on the metal band and on the heater blocks. The heater blocks might last as much as one to three months but often would last only one week to ten days. The wear on the metal band was even more excessive and the band might last for one week but might last only a few hours. Even more of a problem was the excessive downtime of the machine while the band was being replaced or the heater blocks were being replaced or repaired. Still another problem was to attempt to accurately determine when a particular heater in a heater block had burned out. These heaters often burned out at the rate of three or four a week.

Another type of prior art sealing machine used stationary heater bars with the bags or other heat sealable material sliding along in contact with these heater bars. It was found that with the bags sliding on the heater bars one could not use much pressure of the bar against the bag otherwise the machine did not function properly, and without much pressure there was not much heat transfer so that an excessively long machine might be required in order to transfer enough heat into the bag to perform a sealing operation. Where the bars were kept only in close proximity to the bag without touching, for example, a one-eighth of an inch spacing, then a heating machine sixty feet in length was required in order to impart enough heat to the bags, and even then only about sixty bags per minute could be processed by the machine.

SUMMARY OF THE INVENTION

The problem to be solved is how to construct a sealing mechanism which is more productive, has less downtime, is more energy efficient, has less heat loss into the ambient surrounding the machine, has less frictional wear and has less thermal mass so as to be more responsive to the changes of required heat. This problem is solved by a sealing machanism comprising, in combination, conveyor means adapted to move first and second portions of heat sealable material in juxtaposed relationship in a first path, said conveyor means including pulley means, metal band means trained around said pulley means to establish first and second band runs on opposite sides of and along said first path, pressure means urging transversely toward each other said band runs with the heat sealable material portions adapted to be disposed therebetween to establish a sealing zone, and means establishing an electrical current flow in at least part of said metal band runs to heat said part and conduct heat in said sealing zone to said heat sealable material portions to cause said portions to be sealed together under heat and pressure.

An object of the invention is to provide a sealing mechanism wherein wear of the heated parts is virtually eliminated.

Another object of the invention is to provide a heat sealing mechanism wherein the heat is developed in the endless metal bands which are in contact with the heat sealable material.

Another object of the invention is to provide a heat sealing mechanism which lowers the thermal mass of the parts to be heated to be much more quickly heat responsive.

Another object of the invention is to provide a heat sealing mechanism with electrical brush means to impart electrical current directly into the endless metal band for heating thereof.

Other objects and a fuller understanding of the invention may be had by referring to the following description and claims, taken in conjunction with the accompanying drawing.

BRIEF DESCRIPTION OF THE DRAWING

FIG. 3 is an enlarged sectional view on line 3—3 of FIG. 2;

FIG. 4 is a sectional view on line 4—4 of FIG. 3;

DESCRIPTION OF THE PREFERRED EMBODIMENT

Figure 2:
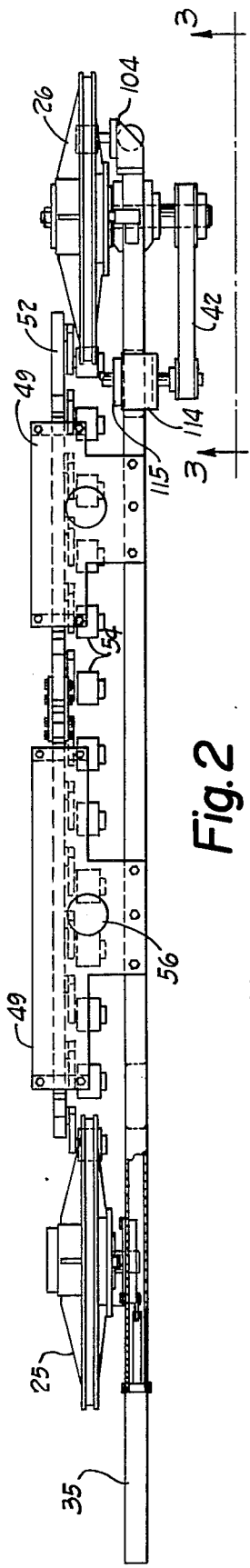
FIG. 2 is a plan view of the machine of FIG. 1.
Figure 1:
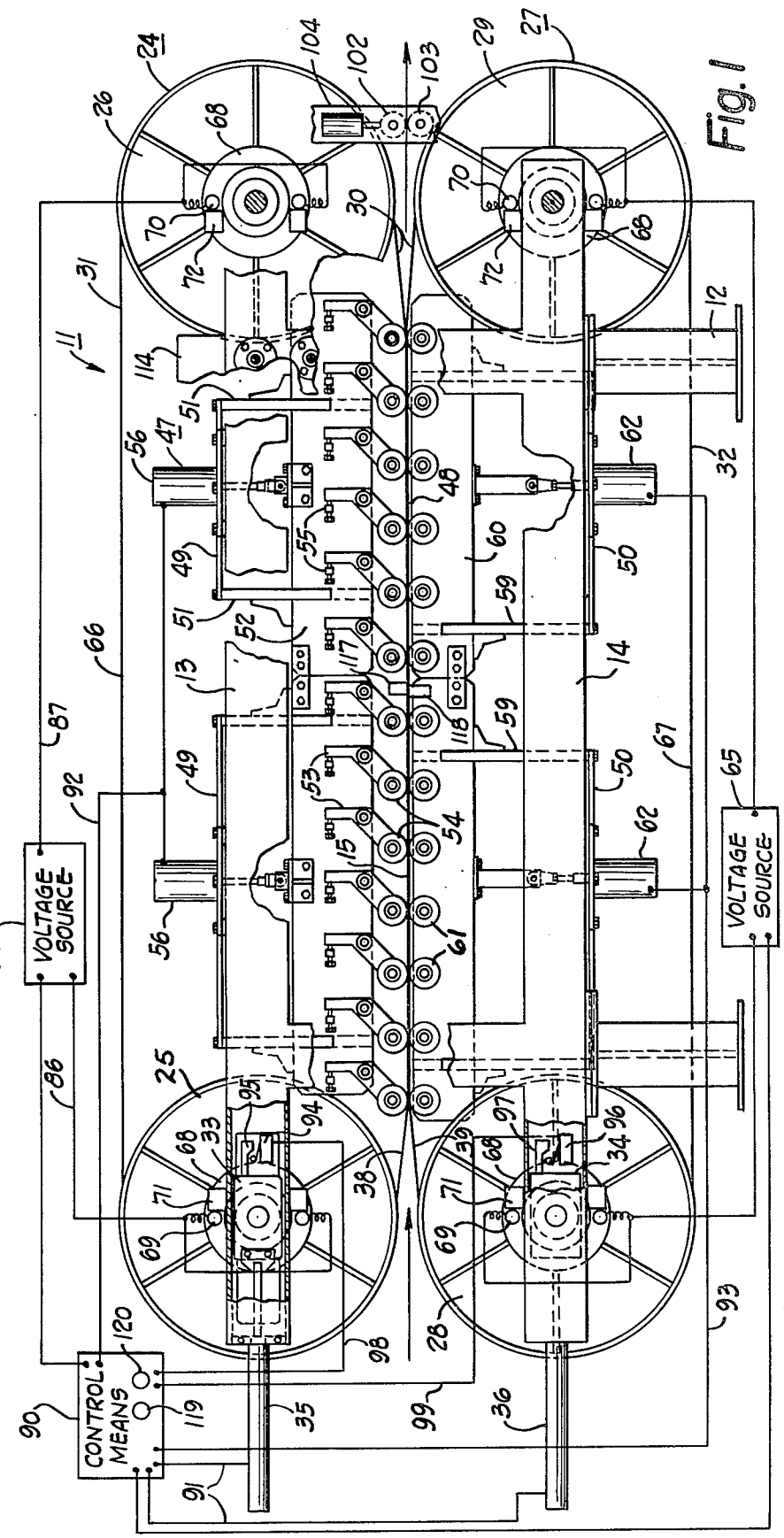
FIG. 1 is a side elevational view of a machine embodying the invention.
Figure 7:
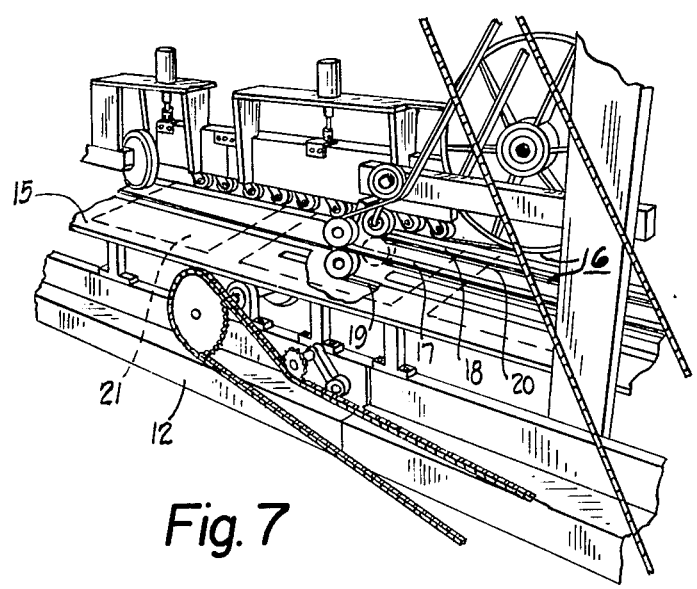
FIG. 7 is a partial perspective view, to a reduced scale, of the machine of FIG. 1.

The drawing illustrates a machine which embodies the invention of a heat sealing mechanism 11 with FIG. 1 illustrating a side view and FIG. 7 illustrating a somewhat similar partial perspective view of the machine. The machine 11 has a base 12 on which upper and lower longitudinal frame members 13 and 14, respectively, are mounted. A table 15 is mounted on the base 12 and is adapted to support the heat sealable material. Conveyor means 16 is provided to convey the heat sealable material along the length of the table 15. This conveyor means 16 includes friction bands 17, 18 mounted on pulleys for longitudinal movement above the surface of the table 15 and complementary friction bands 19 and 20 mounted on pulleys journaled below the table surface. The friction bands 19 and 20 are just above the table surface to create a nip through which the heat sealable material may be conveyed longitudinally through the machine 11.

In one practical machine constructed in accordance with the invention, the heat sealable material was a polyethylene ply or liner on the inner surface of a two ply kraft paper bag. This three ply construction was in the form of a flattened tube with one end of this tube being passed through the machine 11 to seal it closed to be a step in the process of forming one closed end on such bag 21. The bands 17–20 are not shown in FIG. 1 in order to show another part of the conveyor means 16. This additional part includes upper and lower sets of pulleys 24 and 27. The upper set of pulleys 24 includes an in-feed pulley 25 and an exit pulley 26. The lower set of pulleys 27 includes an in-feed pulley 28 and an exit pulley 29. Metal band means 30 is trained around the pulleys as a part of the conveyor means and in this preferred embodiment there is an upper endless band 31 and a lower endless band 32. These are metal bands and in a machine constructed in accordance with the invention they were stainless steel bands approximately one-half inch wide and about thirty-two thousandths of an inch thick. The exit pulleys 26 and 29 are journaled on the upper and lower frame members, respectively, whereas the in-feed pulleys 25 and 28 are journaled on blocks 33 and 34, respectively, which are longitudinally slidably journaled in the upper and lower frame members, respectively. Fluid cylinders 35 and 36 have the piston rods thereof acting on the blocks 33 and 34 to maintain a proper tension on the endless bands. The upper band 31 has a first band run 38 and the lower endless band 32 has a second band run 39 which are adapted to be a part of the conveyor means 16 by acting on the heat sealable material to aid in conveying it through the machine 11. A motor 41 is connected through an overrunning clutch 40, for a purpose described below, through a belt 42 to drive the lower exit pulley 29 and is connected through gears 43 and a belt 44 to drive the upper exit pulley 26. A drive train, not shown, is connected to move the friction bands 17–20 at the same surface speed as the speed of the endless metal bands 31 and 32. Together these bands provide the means to convey the heat sealable material through the machine 11.

The first and second band runs 38 and 39 are urged transversely toward each other by pressure means 47 so that with the two heat sealable portions being juxtaposed between the band runs 38 and 39, they are conveyed through a sealing zone 48. The first and second band runs 38, 39 move in first and second longitudinal paths through this sealing zone 48.

The pressure means 47 includes upper brackets 49 mounted on the upper frame member 13 and lower brackets 50 mounted on the lower frame member 14. The upper brackets 49 carry depending forks 51 which slidably journal an insulating plate 52 for vertical movement. This plate 52 journals a plurality of levers 53 each of which carries on the lower end thereof a pressure roll 54. The upper end of each lever may act against an adjustable stop 55. Fluid cylinders 56 are mounted on the upper brackets 49 and connected to raise and lower the insulating plate 52. When lowered, the plate moves downwardly to an adjustable stop position whereat the rolls 54, by their weight, push the band run 38 downwardly to a reference plane established generally at the level of the table 15 and the level of the nip of the friction bands 17–20. When the fluid cylinders 56 raise the insulating plate 52, then the adjustable stops 55 come into use to keep the rollers 54 from dropping downwardly, and thus this is a pressure relieved condition.

The pressure means 47 includes a structure on the lower frame member 14 somewhat similar to that on the upper frame member 13. The lower brackets 50 carry upstanding forks 59 which slidably journal an insulating plate 60 for vertical movement. Pressure rolls 61 are journaled along the upper edge of this insulating plate 60. The pressure means 47 includes fluid cylinders 62 which act between the lower frame member 14 and the insulating plate 60 to raise and lower this plate. FIG. 1 shows this plate in the upper position which is the condition at which pressure is applied to the lower band run 39 to move it upwardly into the reference plane. When the fluid cylinders 62 are activated downwardly this is the pressure relieved condition and no pressure is applied to the band run 39. In the position shown in FIG. 1, the band runs 38, 39 apply transverse pressure to any bags or other sealable material disposed therebetween.

The sealing zone 48 is a zone whereat heat and pressure is applied to the bags or other sealable material from the band runs 38 and 39. Heat is imparted to these band runs by electrical current flow in such band runs 38 and 39. The electrical current flow is established by voltage source means shown as voltage sources 64 and 65. In the embodiment shown, the current flow is not only in the lower band run 38, but is also in a third band run 66 of the upper endless band 31, and is also in a fourth band run 67 on the lower side of the lower endless band 32. The current may be established in the band runs 38 and 39 by an induced current but in this preferred embodiment the electrical current flow is established by electrical contact means from the voltage sources 64 and 65 to the band runs 38 and 39. The electrical contact means includes the pulleys 25, 26, 28 and 29, a slip ring 68 on each pulley, and electrical brushes 69 for the in-feed pulleys and brushes 70 for the exit pulleys.

The in-feed pulley brushes 69 are insulatedly mounted by brush mounts 71 on the slidable blocks 33 and 34, and these in-feed pulley brushes 69 cooperate with the respective slip rings 68 on these in-feed pulleys. The exit pulley brushes 70 are mounted by insulated brush mounts 72 to the upper and lower frame members 13 and 14 so that the brushes 70 cooperate with the slip rings 68 on these exit pulleys 26 and 29.

Figure 5:
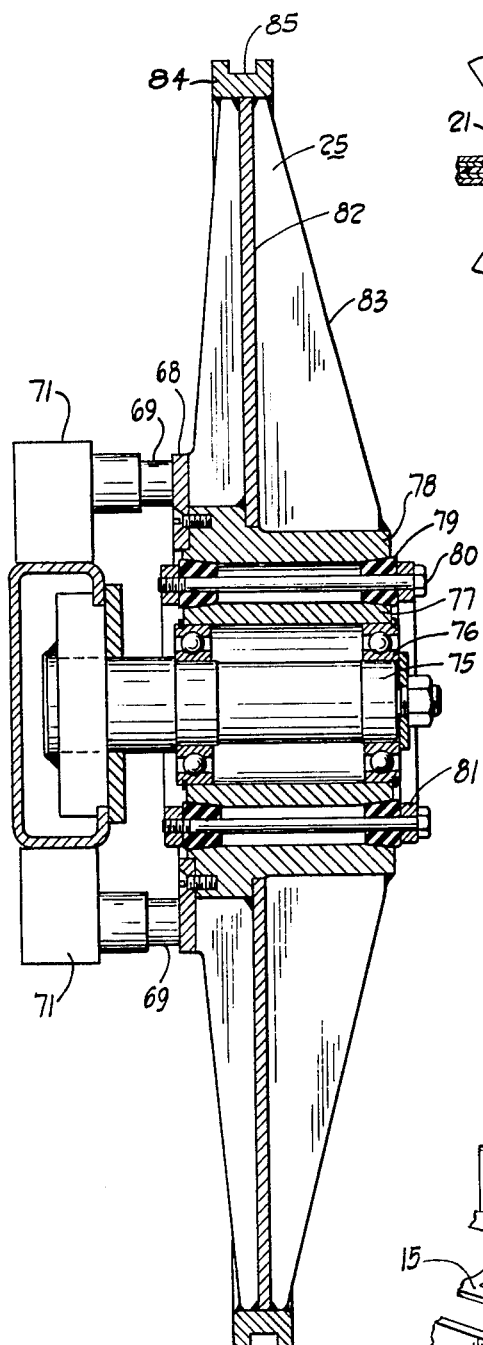
FIG. 5 is an enlarged vertical sectional view of an idler pulley for the heated band.
Figure 6:
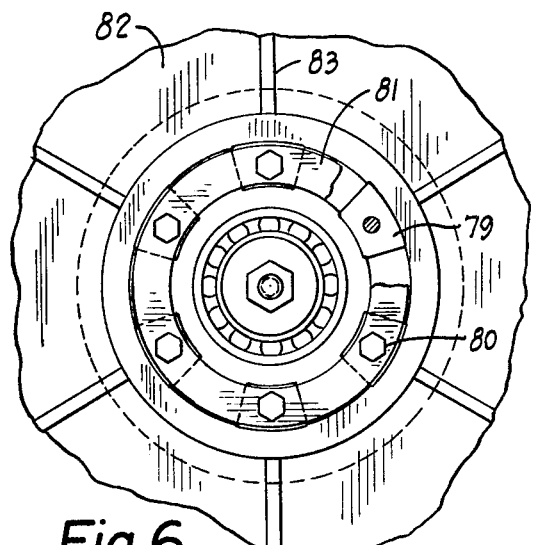
FIG. 6 is a partial end view of the pulley of FIG. 5.

FIGS. 5 and 6 show in more detail the construction on one of the in-feed pulleys 25 or 28. A stub axle 75 is fixed in the upper frame member 13 and bearings 76 journal an inner hub 77. The pulley 25, for example, has an outer hub 78 which is insulated from the inner hub 77 by insulators 79 which are short arcuate segments urged together by bolts 80 which in turn are spaced by annular rings 81. An annular web 82 and stiffening ribs 83 support a peripheral rim 84 which has a band guiding surface 85 which is a peripheral groove to receive the endless band 31 or 32. Such band circumscribes approximately 180 degrees of the band guiding surface 85, so that the electrical current from the brushes 69 is conducted through the slip ring 68 and through the outer portions of the pulley 25 to this endless band.

The tension providing fluid cylinders 35 and 36 provide a good contact between the band and the band guiding surface for effective transfer of electrical current. The exit pulleys 26 and 29 are constructed similarly to the in-feed pulleys except that this is the driving end of the machine, so the bearing 76 is omitted, and the inner hub is fastened by a key 88 to the stub axle.

The voltage source 64 is shown as being connected by conductors 86 and 87 to the brushes 69 and 70, respectively. The voltage source may be either AC or DC but in any particular instant the current may enter the brushes 69, pass through the first and third band runs 38 and 66 and exit through the brushes 70. This means that the two band runs 38 and 66 are in parallel in this particular heating circuit. The voltage source 65 is connected in a similar manner to the brushes on the lower set of pulleys. The voltage sources 64 and 65 are controlled by a control means 90 which is also connected by conductors 91 to control the fluid cylinders 35 and 36. The control means 90 is connected by a conductor 92 to control the fluid cylinders 56 and by a conductor 93 to control the fluid cylinders 62. A limit switch 94 is mounted on the upper frame member 13 to be actuated by a cam 95 on block 33 if the endless band 31 should break and hence the fluid cylinder 35 would move the sliding plate 33 to the left as viewed in FIG. 1. Similarly, a limit switch 96 is mounted on the lower frame member 14 to be actuated by a cam 97 carried on the sliding block 34 should the lower endless band 32 break and hence the fluid cylinder 36 move the in-feed pulley 28 to the left as viewed in FIG. 1. These limit switches 94 and 96 are also connected by conductors 98 and 99, respectively, to the control means 90.

Figure 8:
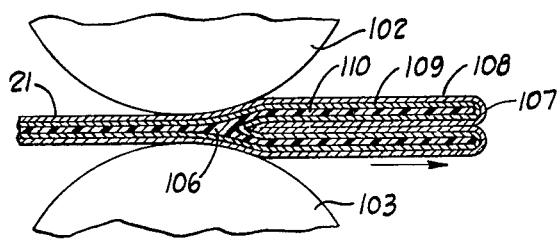
FIG. 8 is an enlarged sectional view of a bag being sealed and passing through pinch rolls.

As an adjunct to the pressure means 47, pinch rolls 102 and 103 may be provided to act directly on the bag 21 or other heat sealable material. FIG. 3 illustrates that these pinch rolls are provided outboard of the exit end pulleys with the pinch roll 103 journaled on a bracket 104 carried on the upper frame member 13. A drive train 101 rotates the pinch rolls at the surface speed of the bands 30. A fluid cylinder 105 is also mounted on this bracket and urges the pinch roll 102 downwardly toward the pinch roll 103 with the bag 21 therebetween. This may be an air pressure cylinder 105 to provide a yielding urging force. The small diameter of these pinch rolls 102 and 103 acting directly on the bag 21 while the heat sealable material therein is still hot, has been found to be a very satisfactory way to assure that complete sealing of the material is effected. As an example, FIG. 8 shows one embodiment of the invention where gusseted paper bags 21 are being sealed together at one end. In such use, one may have bags of the aforementioned construction; namely, two plys of kraft paper 108 and 109 and an inner ply 110 of polyethylene film. Where the bags have a side gusset 107, and the sealing is across one end, then the two gussets in each side establish places where there are eight thicknesses of paper and four thicknesses of polyethylene film. Such bags may be used in a trash compactor, for example, or used to contain powdered food material wherein absolutely no leakage of either fine powder or liquid is to be permitted. Adjacent the vertex of the "M" of the gusset, there is an area 106 immediately adjacent the vertex of this "M" where the polyethylene film material is caused to flow together by the force of the pinch rolls 102 and 103 to thus eliminate any pin hole leak adjacent this vertex.

As an option the machine 11 may be provided with an infrared heat sensor 117 positioned, for example, near the middle of the sealing zone 48 to sense the heat in the band run 38 and another sensor 118 may be provided to sense the heat in the band run 39. These heat sensors may be connected to the control means 90 to control the voltage souces 64 and 65, respectively, for controlled heat supply. The control means normally provides potentiometers 119 and 120 to manually control the amount of heat in the band runs 38 and 39, respectively.

OPERATION

FIG. 8 illustrates a bag 21 which may be an example of something having heat sealable material to be sealed by the machine 11. The bag as illustrated in FIG. 8 is one which has an outer layer 108 and an inner layer 109 of kraft paper and then an inner ply 110 of polyethylene. In this view of FIG. 8, the bag has already passed through the sealing zone 48 of the machine 11 so that the two inner plys of polyethylene film 110 which touch each other have been fused together to be shown as a single film in FIG. 8. Many different types of heat sealable material may be sealed by the machine 11 and they may be exemplified by the bags 21 which are shown in FIG. 7 as being moved along the table 15 by the conveyor means 47. This conveyor means includes the friction bands 17-20 as well as the endless metal bands 31 and 32. Such metal bands are along one end of the tubular bag forms in order to seal closed that one end to form an open ended bag, as an example. The voltage sources 64 and 65 may be sources similar to a welding current source; namely, low voltage and high current. As an example 30 to 40 volts may be the open circuit voltage and up to 100 amperes may be passed through the endless bands. As shown in FIG. 1, the preferred embodiment is that the band runs 38 and 66 are electrically in parallel so that each receives half of this current and this rapidly heats the band to operating temperature, for example, within 30 seconds.

The band has a low thermal mass so that it may be heated rapidly, as distinguished from the large heater blocks of the prior art. A suitable operating temperature might be 400 to 450 degrees so that the paper of the bags 21 will not be scorched. The sealing zone 48 may be any suitable length to impart heat through the kraft paper of the bags to the heat sealable material 110 and a length of six to ten feet may be typical. The slip rings 69 may be copper or bronze, for example, for good electrical conductivity with the brushes 69 and 70. Such brushes may be typical electrical motor brushes of a carbon composition for good non-sparking conduction of electricity between the brush and slip ring. The diameter of the slip ring is much smaller than the diameter of the band guiding surface 85 so that the relative surface speed between the brushes and slip rings is considerably lower than the surface speed of the band runs 38 and 39. This also aids in the non-sparking transfer of electrical current at the brushes. The large diameter of the pulleys 25-29 with the large approximately 180 degree contact surface between the pulleys and bands also promotes non-sparking transfer of electrical current from the pulleys to the band. The pulleys may be of steel, for example, or other economical metal yet because of the large surface area, the electrical current is readily transferred through this pulley.

For operation of the machine 11, the pressure means 47 is in the position in FIG. 1; namely, with the band runs 38 and 39 pressed into engagement with the outer surface of the bags 21. Each roll may weight approximately six pounds, as an example, thus forcing the band runs into intimate contact with the outer surface of the bags. The heat from the bands is thus readily transferred into the bags, through the kraft paper and to the polyethylene liner 110. The two portions of the polyethylene liner which are in mutual engagement are thus heated and softened so that they are forced together by the force of the pressure means and as the bags leave the exit end of the machine, the pinch rolls 102, 103 provide a final force urging together the heat sealable material to make certain that areas such as the area 106 shown in FIG. 8 are completely sealed with no pin hole leaks.

Should one of the bands such as endless band 31 break, then the fluid cylinder 35 will move the sliding block 33 to the left and actuate the limit switch 94. This acts through the control means 90 to interrupt the flow of current from the voltage sources 64 and 65 and also acts on the fluid cylinders 56 and 62. These cylinders are actuated to the pressure relieved condition spreading apart the insulating plates 52 and 60 so that the remaining unbroken band is not in contact with the bags 21. This quickly prevents any overheating of the bags. Also if the machine should be stopped for any particular reason, for example, a jamming of the feed of the bags, then the control means 90 also interrupts the flow of the current from the voltage sources 64 and 65 and actuates the pressure means to the pressure relieved condition.

When the machine is stopped the air cylinders 56 and 62 separate the insulator plates 52 and 60, and an auxiliary motor 114 acts through an overrunning clutch 115 to gears 43 to keep the pulleys 25-29 running as a heat sink for the heat remaining in the endless bands 31 and 32. The overrunning clutch 40 keeps the motor 114 from having to turn the deenergized motor 41.

Upon restarting the machine the band rapidly gets up to operating temperature so that the downtime is minimized and most importantly the scrap due to faulty sealing is minimized.

The machine 11 eliminates the friction between stationary heater blocks and the moving endless bands. Such friction has been suggested by many of the prior heat sealing machines and at first it would appear this would not be a problem. However, in actual practice it has been found that this way a very serious problem and greatly hampered production capacity. The friction rather quickly wore out both the heater blocks and the endless bands. If the pressure between the heater block and the band was made large, then this produced excessive wear on both the block and the band with considerable downtime of the machine for replacement of the blocks and bands. This defeated the purpose of applying greater pressure which was to get greater heat transfer and thus greater productivity from the machine. If the pressure from the heater block to the band was made small, then the band life and heater block life was increased but then the flow of heat into the band was greatly reduced and the machine might have to be made as much as 60 feet long in order to transfer enough heat into the band. With such long machines and many heater blocks, then the problem of trying to locate a particular heater that was burned out was greatly magnified. Also the amount of heat imparted to the ambient air was considerable. This was wasteful of energy and also uncomfortable for the personnel who tended the machine.

The present machine eliminates this friction which was a deterrent to high production. The prior art machines might produce sixty sealed bags per minute yet a machine in accordance with the present invention has been able to produce 200 bags per minute with a considerable saving of energy. Also the machine is smaller and lighter and thus more economical to construct.

Another advantage is that in the prior art system if one attempted to produce more than about 50 bags a minute, then the wear between the heater blocks and the band became excessive with greater amounts of downtime which defeated the purpose of trying to make the machine go faster. The present machine eliminates this frictional wear and the stainless steel bands 31 and 32 last many times longer than in the prior art machines. This means that the downtime and scrap are minimized and production is maximized.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A sealing mechanism comprising, in combination, conveyor means adapted to move first and second portions of heat sealable material in juxtaposed relationship in a first path,
said conveyor means including pulley means,
a rotatable hub and a band guiding surface on said pulley means,
insulating means relatively insulating said rotatable hub and said band guiding surface,
metal band means trained around said band guiding surface of said pulley means to establish first and second band runs on opposite sides of and along said first path,
pressure means urging transversely toward each other said band runs with the heat sealable material portions adapted to be disposed therebetween to establish a sealing zone,
and means establishing an electrical current flow in said band guiding surface and into at least part of said metal band runs to heat said part and conduct heat in said sealing zone to said heat sealable material portions to cause said portions to be sealed together under heat and pressure.

2. A sealing mechanism as set forth in claim 1, including an electrically conductive slip ring mounted outboard of said insulating means on said pulley means to be electrically conductive with said band guiding surface, and
an electrical brush physically mounted on a relatively stationary portion of the mechanism adapted to cooperate with said slip ring.

3. A sealing mechanism as set forth in claim 2, including a second electrical brush cooperating with a second electrically conductive slip ring mounted on a different one of said pulley means to conduct electrical current therethrough.

4. A sealing mechanism as set forth in claim 1, wherein said pulley means includes first and second pulleys at opposite ends of said sealing zone,
a rotatable hub and a band guiding surface on each said pulley, said insulating means relatively insulating the hub and band guiding surface on each said pulley, said metal band means being trained around said band guiding surfaces of said first and second pulleys with said first band run being in said sealing zone and said band means having a third band run extending between said first and second pulleys and separate from but generally parallel to said sealing zone, and said electrical current flow being established in parallel through said first and third band runs from the band guiding surface of said first pulley to the band guiding surface of said second pulley.

5. A sealing mechanism as set forth in claim 4, including an electrical brush and slip ring assembly connected to supply electrical current to said band guiding surface of said first pulley.

6. A sealing mechanism including an endless metal band entrained on pulleys to have at least one band run extending in a first path through a sealing zone, said band being longitudinally movable and transversely urged by pressure means toward engagement with a movable paper or heat sealable material having two portions to be sealed together by application of heat in the sealing zone, and electrical contact means engaging the metal band at one end of the sealing zone to conduct electrical current into the band to heat same, the improvement comprising, selective means to selectively operate said pressure means to a first condition to apply transverse pressure to the band run for sealing of any heat sealable material, and said selective means operating said pressure means to a pressure relieved second condition away from the band run to relieve any pressure thereon in response to any interruption of movement of the sealable material through the sealing mechanism.

7. A sealing mechanism including an endless metal band entrained on pulleys to have at least one band run extending in a first path through a sealing zone, said band being longitudinally movable and transversely urged by pressure means toward engagement with a movable paper or heat sealable material having two portions to be sealed together by application of heat in the sealing zone, and electrical contact means engaging the metal band at one end of the sealing zone to conduct electrical current into the band to heat same, the improvement comprising, selective means to selectively operate said pressure means to a first condition to apply transverse pressure to the band run for sealing of any heat sealable material, and said selective means operating said pressure means to a pressure relieved second condition away from the band run to relieve any pressure thereon in response to loss of tension in said metal band.

8. A sealing mechanism including an endless metal band entrained on pulleys to have at least one band run extending in a first path through a sealing zone, said band being longitudinally movable and transversely urged by pressure means toward engagement with a movable paper or heat sealable material having two portions to be sealed together by application of heat in the sealing zone, and electrical contact means engaging the metal band at one end of the sealing zone to conduct electrical current into the band to heat same, the improvement comprising, selective means to selectively operate said pressure means to a first condition to apply transverse pressure to the band for sealing of any heat sealable material, said selective means operating said pressure means to a pressure relieved second condition away from the band run to relieve any pressure thereon, and means responsive to a loss of tension in said metal band to interrupt the electrical current flow through said electrical contact means.

* * * * *